United States Patent
Li et al.

(10) Patent No.: US 7,787,431 B2
(45) Date of Patent: Aug. 31, 2010

(54) METHODS AND APPARATUS FOR MULTI-CARRIER COMMUNICATIONS WITH VARIABLE CHANNEL BANDWIDTH

(76) Inventors: Xiaodong Li, 9919 129th Pl. NE., Kirkland, WA (US) 98033; Titus Lo, 13312 SE. 43rd St., Bellevue, WA (US) 98006; Kemin Li, 4228 144th La. SE., Bellevue, WA (US) 98006; Haiming Huang, 605 141st Ct. SE. #D203, Bellevue, WA (US) 98007

( * ) Notice: Subject to any disclaimer, the term of this patent is extended or adjusted under 35 U.S.C. 154(b) by 467 days.

(21) Appl. No.: 10/583,534

(22) PCT Filed: Apr. 29, 2005

(86) PCT No.: PCT/US2005/014828
§ 371 (c)(1),
(2), (4) Date: Jun. 5, 2007

(87) PCT Pub. No.: WO2005/112566
PCT Pub. Date: Dec. 1, 2005

(65) Prior Publication Data
US 2007/0242600 A1 Oct. 18, 2007

Related U.S. Application Data

(60) Provisional application No. 60/567,233, filed on May 1, 2004.

(51) Int. Cl.
*H04J 1/00* (2006.01)
(52) U.S. Cl. ........................ 370/343; 370/203; 370/437; 370/468; 370/485; 370/536
(58) Field of Classification Search ................. 370/343, 370/408, 485, 536
See application file for complete search history.

(56) References Cited

U.S. PATENT DOCUMENTS

| 5,793,757 | A | 8/1998 | Uddenfeldt |
| 5,864,546 | A * | 1/1999 | Campanella ................. 370/316 |
| 5,991,308 | A | 11/1999 | Fuhrmann et al. |
| 6,175,550 | B1 * | 1/2001 | van Nee ...................... 370/206 |

(Continued)

OTHER PUBLICATIONS

Yi et al., "Orthogonal multicarrier bandwidth modulation scheme for wireless communications," The 13th IEEE International Symposium on Personal Indoor and Mobile Radio communications, Sep. 2002, vol. 5, pp. 2054-2058.

(Continued)

*Primary Examiner*—Huy D Vu
*Assistant Examiner*—Maria L. Sekul
(74) *Attorney, Agent, or Firm*—Schwabe, Williamson & Wyatt, P.C.

(57) ABSTRACT

Methods and apparatus for multi-carrier communication with variable channel bandwidth are disclosed, where the time frame structure and the OFDM symbol structure are invariant and the frequency-domain signal structure is flexible. In one embodiment, a mobile station, upon entering a geographic area, uses a core-band to initiate communication and obtain essential information and subsequently switches to full operating bandwidth of the area for the remainder of the communication. If the mobile station operates in a wide range of bandwidths, the mobile station divides the full range into sub-ranges and adjusts its sampling frequency and its FFT size in each sub-range.

27 Claims, 10 Drawing Sheets

U.S. PATENT DOCUMENTS

| | | | |
|---|---|---|---|
| 7,372,909 B2 * | 5/2008 | Miyoshi | 375/260 |
| 7,376,424 B2 * | 5/2008 | Kim et al. | 455/436 |
| 2002/0018527 A1 * | 2/2002 | Vanderaar et al. | 375/259 |
| 2002/0142777 A1 * | 10/2002 | McGovern et al. | 455/450 |
| 2004/0224691 A1 | 11/2004 | Hadad | |
| 2005/0180314 A1 | 8/2005 | Webster et al. | |
| 2005/0201476 A1 | 9/2005 | Kim et al. | |

OTHER PUBLICATIONS

International Search Report and Written Opinion; PCT Application No. PCT/US2005/014828; Applicant Waltical Solutions, Inc.; Date of Mailing: Dec. 27, 2005, 6 pages.

Chinese Office Action for Application No. CN 200580012992.9; Applicant: Neocific, Inc.; Date of Notification: Jan. 29, 2010; 4 pages [translation attached, 4 pages].

* cited by examiner

METHODS AND APPARATUS FOR MULTI-CARRIER COMMUNICATIONS WITH VARIABLE CHANNEL BANDWIDTH

CROSS-REFERENCE TO RELATED APPLICATION(S)

This application is a National Stage Application and claims the benefit of PCT Application No. PCT/US05/14828, filed Apr. 29, 2005 (the '828 application). This application, as well as the '828 application, claims the benefit of U.S. Provisional Patent Application No. 60/567,233, filed on May 1, 2004. This application also relates to PCT Application No. PCT/US2005/001939 filed Jan. 20, 2005, which claims the benefit of U.S. Provisional Application No. 60/540,032 filed Jan. 29, 2004; PCT Application No. PCT/US2005/004601 filed Feb. 14, 2005, which claims the benefit of U.S. Provisional Application No. 60/544,521 filed Feb. 13, 2004; PCT Application No. PCT/US2005/003889 filed Feb. 7, 2005, which claims the benefit of U.S. Provisional Application No. 60/542,317 filed Feb. 7, 2004; and PCT Application No. PCT/US2005/008169 filed Mar. 9, 2005, which claims the benefit of U.S. Provisional Application No. 60/551,589 filed Mar. 9, 2004. The above-listed applications are hereby incorporated by reference.

BACKGROUND

While it is ideal for a broadband wireless communication device to be able to roam from one part of the world to another, wireless communication spectra are heavily regulated and controlled by individual countries or regional authorities. It also seems inevitable that each country or region will have its own different spectral band for broadband wireless communications. Furthermore, even within a country or region, a wireless operator may own and operate on a broadband spectrum that is different in frequency and bandwidth from other operators. The existing and future bandwidth variety presents a unique challenge in designing a broadband wireless communication system and demands flexibility and adaptability.

Multi-carrier communication systems are designed with a certain degree of flexibility. In a multi-carrier communication system such as multi-carrier code division multiple access (MC-CDMA) and orthogonal frequency division multiple access (OFDMA), information is multiplexed on subcarriers that are mutually orthogonal in the frequency domain. Design flexibility is a result of the ability to manipulate parameters such as the number of subcarriers and the sampling frequency. For example, by using a different sampling frequency, a DVB-T (Digital Video Broadcasting-Terrestrial) device is capable of receiving signals broadcasted from a DVB-T station that is operating on a 6-, 7-, or 8-MHz bandwidth.

However, the change in the time-domain structure brings about a series of system problems. A varying sampling rate alters the symbol length, frame structure, guard time, prefix, and other time-domain properties, which adversely affects the system behavior and performance. For example, the MAC layer and even the layers above have to keep track of all the time-domain parameters in order to perform other network functions such as handoff, and thereby the complexity of the system will exponentially increase. In addition, the change in symbol length causes control and signaling problems and the change in the frame structure may cause unacceptable jitters in some applications such as voice over IP. A practical and feasible solution for multi-carrier communication with variable channel bandwidth is desirable.

DETAILED DESCRIPTION

The multi-carrier system mentioned here can be of any format such as OFDM, or Multi-Carrier Code Division Multiple Access (MC-CDMA). The presented methods can also be applied to downlink, uplink, or both, where the duplexing technique is either Time Division Duplexing (TDD) or Frequency Division Duplexing (FDD).

The following description provides specific details for a thorough understanding of the various embodiments and for the enablement of one skilled in the art. However, one skilled in the art will understand that the invention may be practiced without such details. In some instances, well-known structures and functions have not been shown or described in detail to avoid unnecessarily obscuring the description of the embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number in this Detailed Description section also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Multi-Carrier Communication System

Figure 1:
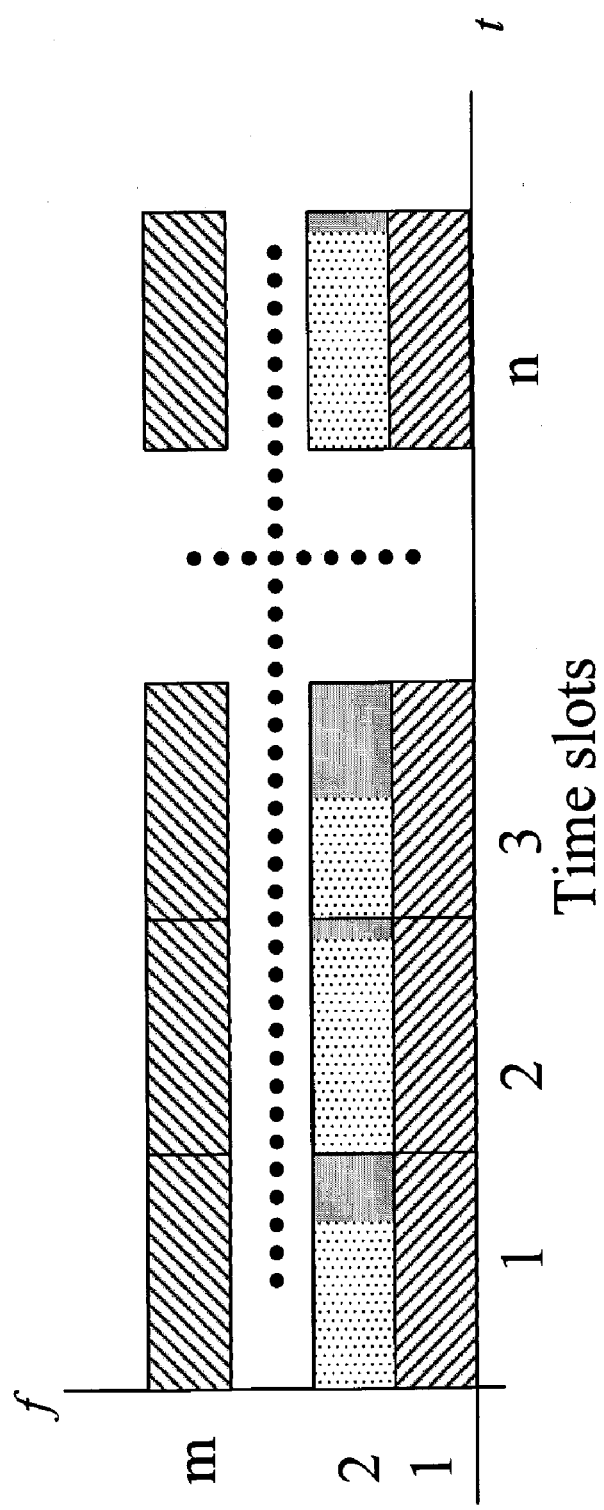
FIG. 1 is a schematic presentation of a radio resource divided into small units in both the frequency and time domains: subchannels and time slots.

The physical media resource (e.g., radio or cable) in a multi-carrier communication system can be divided in both the frequency and time domains. This canonical division provides a high flexibility and fine granularity for resource sharing. FIG. 1 presents a radio resource divided into small units in both the frequency and time domains—subchannels and time slots. The subchannels are formed by subcarriers.

Figure 2:
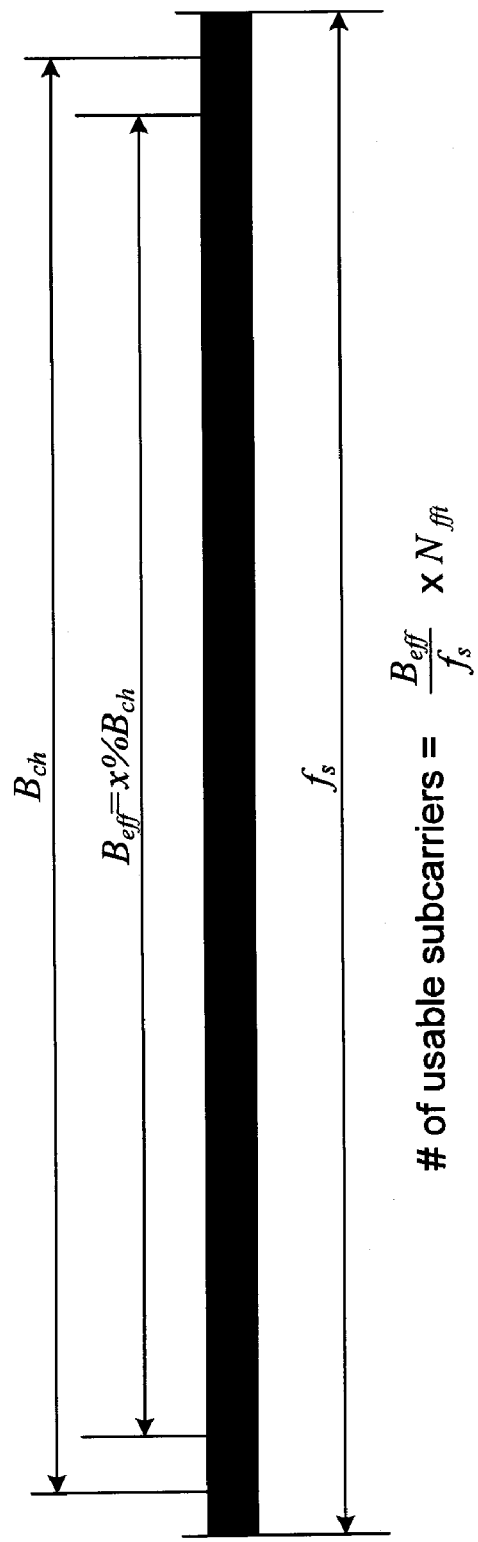
FIG. 2 illustrates a relationship between sampling frequency, channel bandwidth, and usable subcarriers.

The basic structure of a multi-carrier signal in the frequency domain is made up of subcarriers. For a given bandwidth of a spectral band or channel ($B_{ch}$) the number of usable subcarriers is finite and limited, whose value depends on a size of an FFT (Fast Fourier Transform) employed, a sampling frequency ($f_s$), and an effective bandwidth ($B_{eff}$). FIG. 2 illustrates a schematic relationship between the sampling frequency, the channel bandwidth, and the usable subcarriers. As shown, the $B_{eff}$ is a percentage of $B_{ch}$.

Figure 3:
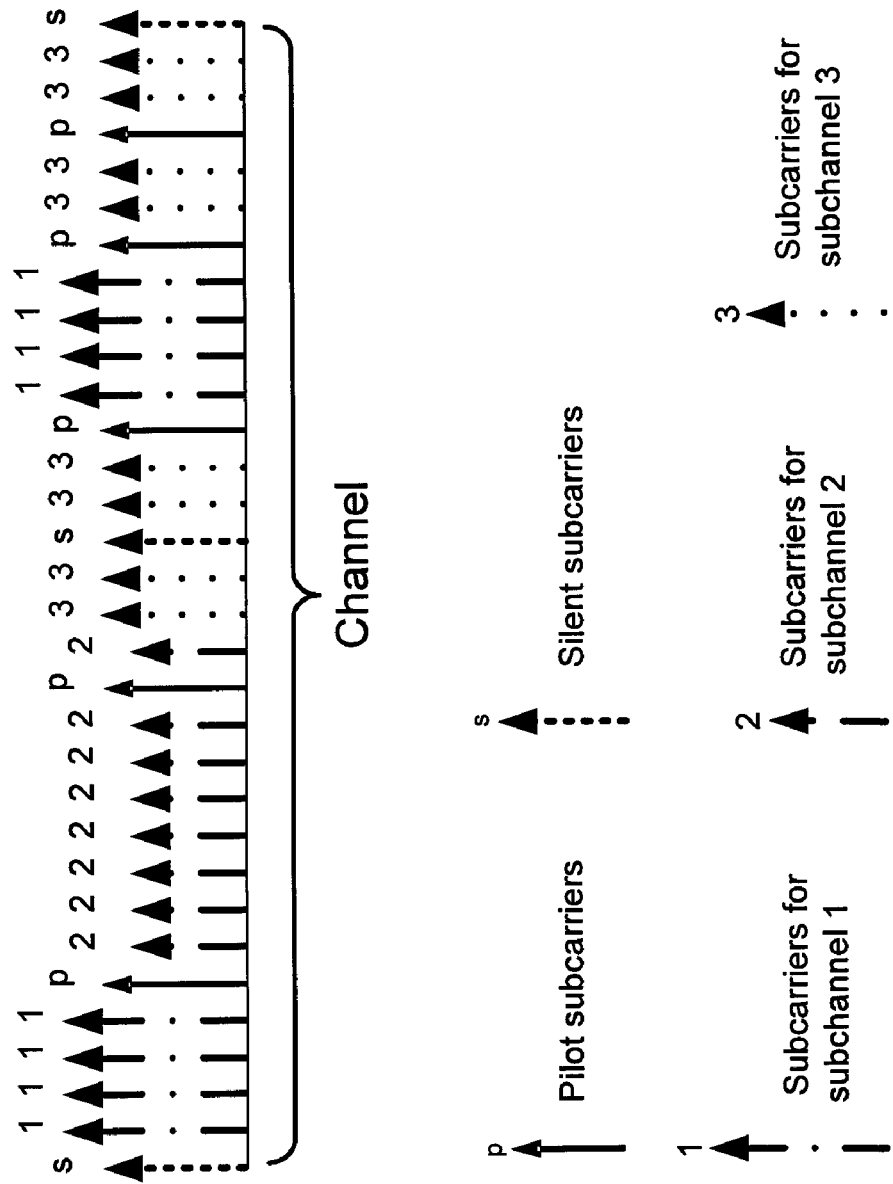
FIG. 3 shows a basic structure of a multi-carrier signal in the frequency domain, made up of subcarriers.

A basic structure of a multi-carrier signal in the frequency domain is made up of subcarriers and, illustrated in FIG. 3, which shows three types of subcarriers as follow:

1. Data subcarriers, which carry information data;
2. Pilot subcarriers, whose phases and amplitudes are predetermined and made known to all receivers, and which are used for assisting system functions such as estimation of system parameters; and
3. Silent subcarriers, which have no energy and are used as guard bands and DC carriers.

The data subcarriers can be arranged into groups called subchannels to support scalability and multiple-access. Each subchannel may be set at a different power level. The subcarriers forming one subchannel may or may not be adjacent to each other. Each user may use some or all of the subchannels. A subchannel formed by the contiguous subcarriers is called a congregated or clustered subchannel. A congregated subchannel may have a different power level from others.

Figure 4:
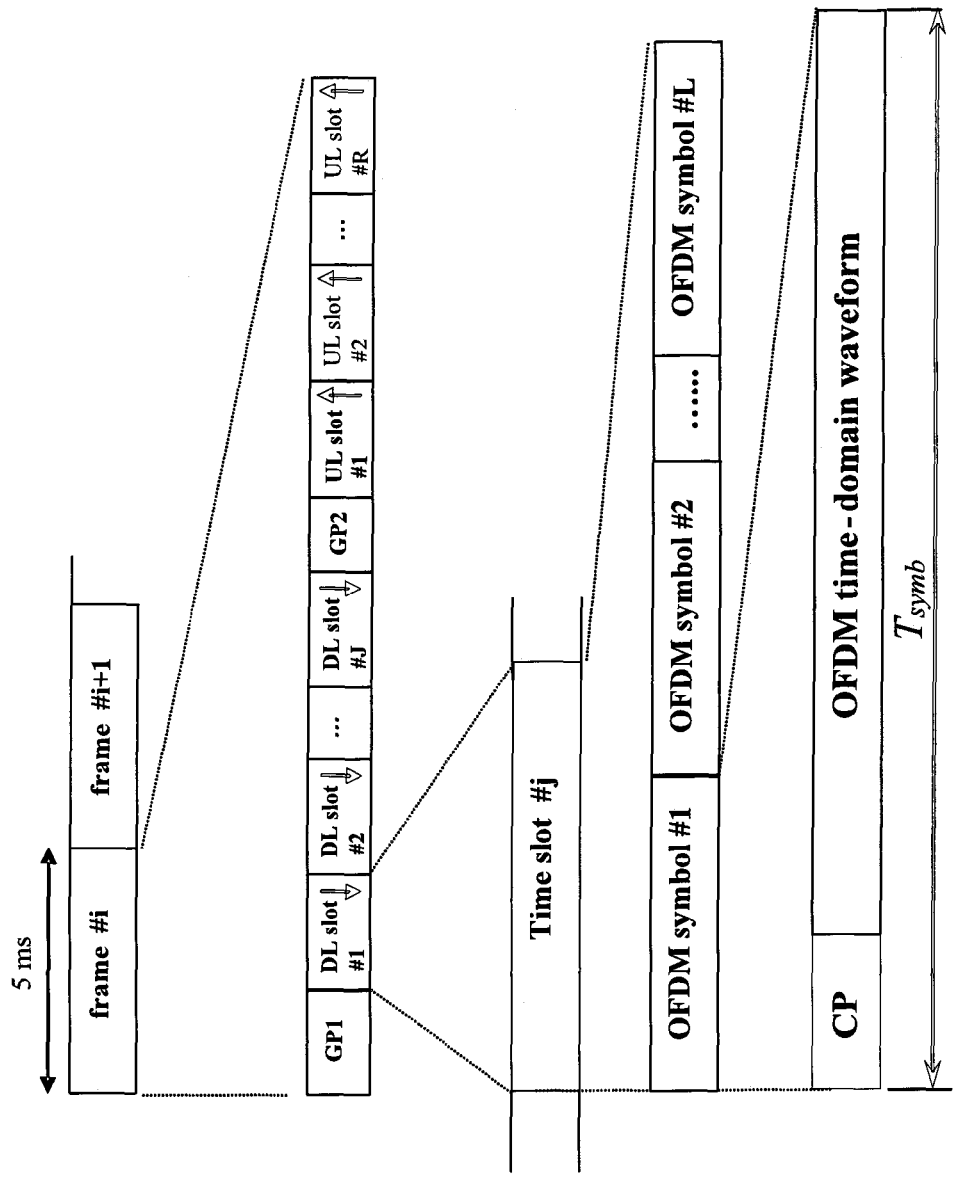
FIG. 4 shows a basic structure of a multi-carrier signal in the time domain, generally made up of time frames, time slots, and OFDM symbols.

FIG. 4 illustrates the basic structure of a multi-carrier signal in the time domain which is generally made up of time frames, time slots, and OFDM symbols. A frame consists of a number of time slots, whereas each time slot is comprised of one or more OFDM symbols. The OFDM time domain waveform is generated by applying the inverse-fast-Fourier-transform (IFFT) to the OFDM signals in the frequency domain. A copy of the last portion of the time waveform, known as the cyclic prefix (CP), is inserted at the beginning of the waveform itself to form an OFDM symbol.

The downlink transmission in each frame begins with a downlink preamble, which can be the first or more of the OFDM symbols in the first downlink (DL) slot. The DL preamble is used at a base station to broadcast radio network information such as synchronization and cell identification.

Similarly, uplink transmission can begin with an uplink preamble, which can be the first or more of the OFDM symbols in the first uplink (UL) slot. The UL preamble is used by mobile stations to carry out the functions such as initial ranging during power up and handoff, periodic ranging and bandwidth request, channel sounding to assist downlink scheduling or advanced antenna technologies, and other radio functions.

Cellular Wireless Networks

Figure 5:
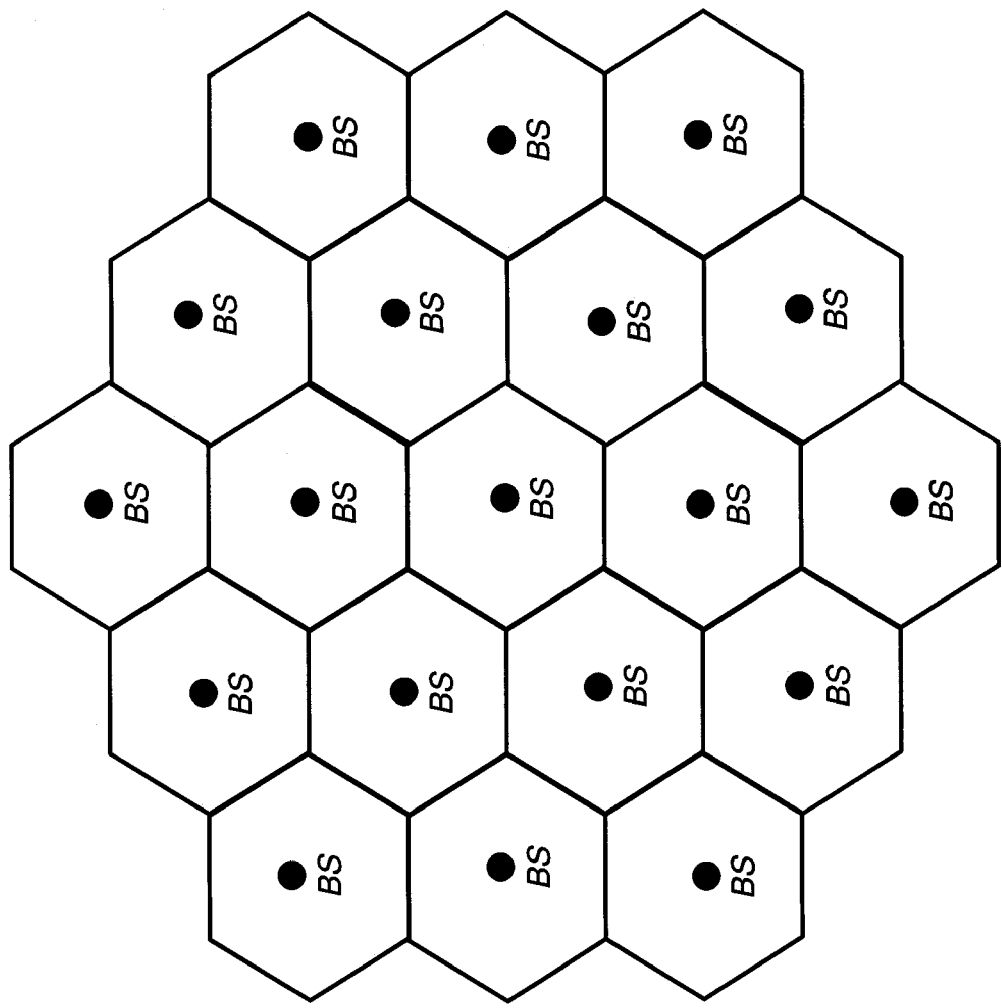
FIG. 5 shows a cellular wireless network comprised of a plurality of cells, wherein in each of the cells coverage is provided by a base station (BS).

In a cellular wireless network, the geographical region to be serviced by the network is normally divided into smaller areas called cells. In each cell the coverage is provided by a base station. This type of structure is normally referred to as the cellular structure. FIG. 5 depicts a cellular wireless network comprised of a plurality of cells. In each of these cells the coverage is provided by a base station (BS).

A base station is connected to the backbone of the network via a dedicated link and also provides radio links to the mobile stations within its coverage. Within each coverage area, there are located mobile stations to be used as an interface between the users and the network. A base station also serves as a focal point to distribute information to and collect information from its mobile stations by radio signals. If a cell is divided into sectors, from system engineering point of view each sector can be considered as a cell. In this context, the terms "cell" and "sector" are interchangeable.

Variable Bandwidth OFDMA

In accordance with aspects of certain embodiments of the invention, a variable bandwidth system is provided, while the time-domain signal structure (such as the OFDM symbol length and frame duration) is fixed regardless of the bandwidths. This is achieved by keeping the ratio constant between the sampling frequency and the length of FFT/IFFT. Equivalently, the spacing between adjacent subcarriers is fixed.

In some embodiments, the variable channel bandwidth is realized by adjusting the number of usable subcarriers. In the frequency domain, the entire channel is aggregated by subchannels. (The structure of a subchannel is designed in a certain way to meet the requirements of FEC (Forward Error Correction) coding and, therefore, should be maintained unchanged.) However, the number of subchannels can be adjusted to scale the channel in accordance with the given bandwidth. In such realization, a specific number of subchannels, and hence the number of usable subcarriers, constitute a channel of certain bandwidth.

Figure 6:
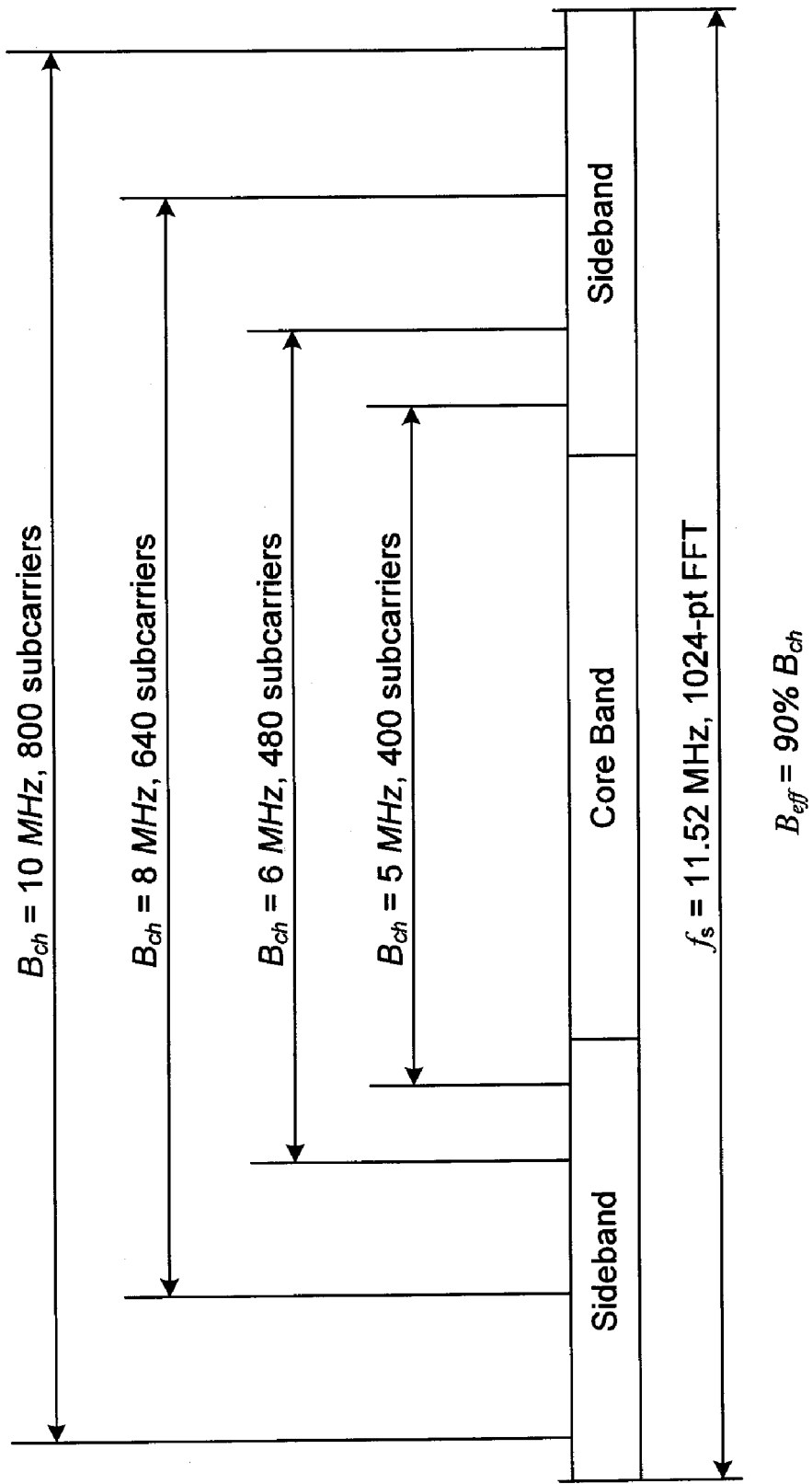
FIG. 6 illustrates a variable channel bandwidth being realized by adjusting a number of usable subcarriers, whose spacing is set constant.

For example, FIG. 6 illustrates the signal structure in the frequency domain for a communication system with parameters specified in Table 1 below. The numbers of usable subcarriers are determined based on the assumption that the effective bandwidth $B_{eff}$ is 90% of the channel bandwidth $B_{ch}$. The variable channel bandwidth is realized by adjusting the number of usable subcarriers, whose spacing is set constant. The width of a core-band is less than the smallest channel bandwidth in which the system is to operate.

TABLE 1

| Sample System Parameters | | | | |
| --- | --- | --- | --- | --- |
| Sampling freq. | | 11.52 MHz | | |
| FFT size | | 1024 points | | |
| Subcarrier spacing | | 11.25 kHz | | |
| Channel bandwidth | 10 MHz | 8 MHz | 6 MHz | 5 MHz |
| # of usable subcarriers | 800 | 640 | 480 | 400 |

Figure 7:
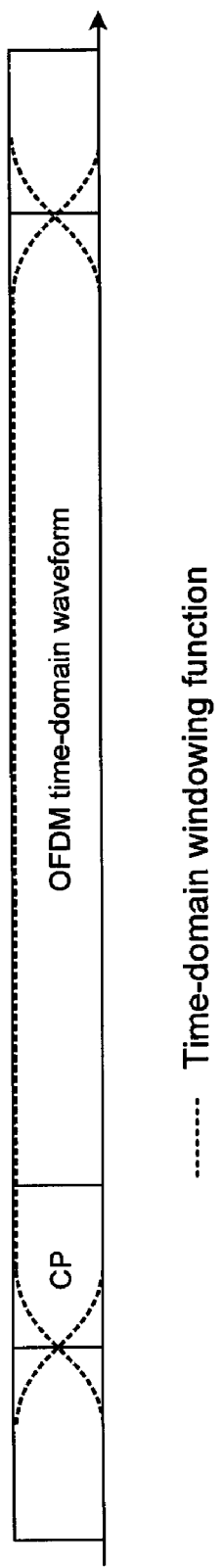
FIG. 7 depicts a time-domain windowing function applied to OFDM symbols to shape the OFDM spectrum to conform to a given spectral mask.

In this realization, using the invariant OFDM symbol structure allows the use of same design parameters for signal manipulation in the time-domain for a variable bandwidth. For example, in an embodiment depicted in FIG. 7, a particular windowing design shapes the spectrum to conform to a given spectral mask and is independent of the operating bandwidth.

Radio Operation Via Core-Band

To facilitate the user terminals to operate in a variable bandwidth (VB) environment, specific signaling and control methods are required. Radio control and operation signaling is realized through the use of a core-band (CB). A core-band, substantially centered at the operating center frequency, is defined as a frequency segment that is not greater than the smallest operating channel bandwidth among all the possible spectral bands that the receiver is designed to operate with. For example, for a system that is intended to work at 5-, 6-, 8-, and 10-Mhz, the width of the CB can be 4 MHz, as shown in FIG. 6. The rest of the bandwidth is called sideband (SB).

In one embodiment relevant or essential radio control signals such as preambles, ranging signals, bandwidth request, and/or bandwidth allocation are transmitted within the CB. In addition to the essential control channels, a set of data channels and their related dedicated control channels are placed within the CB to maintain basic radio operation. Such a basic operation, for example, constitutes the primary state of operation. When entering into the network, a mobile station starts with the primary state and transits to the normal full-bandwidth operation to include the sidebands for additional data and radio control channels.

Figure 8:
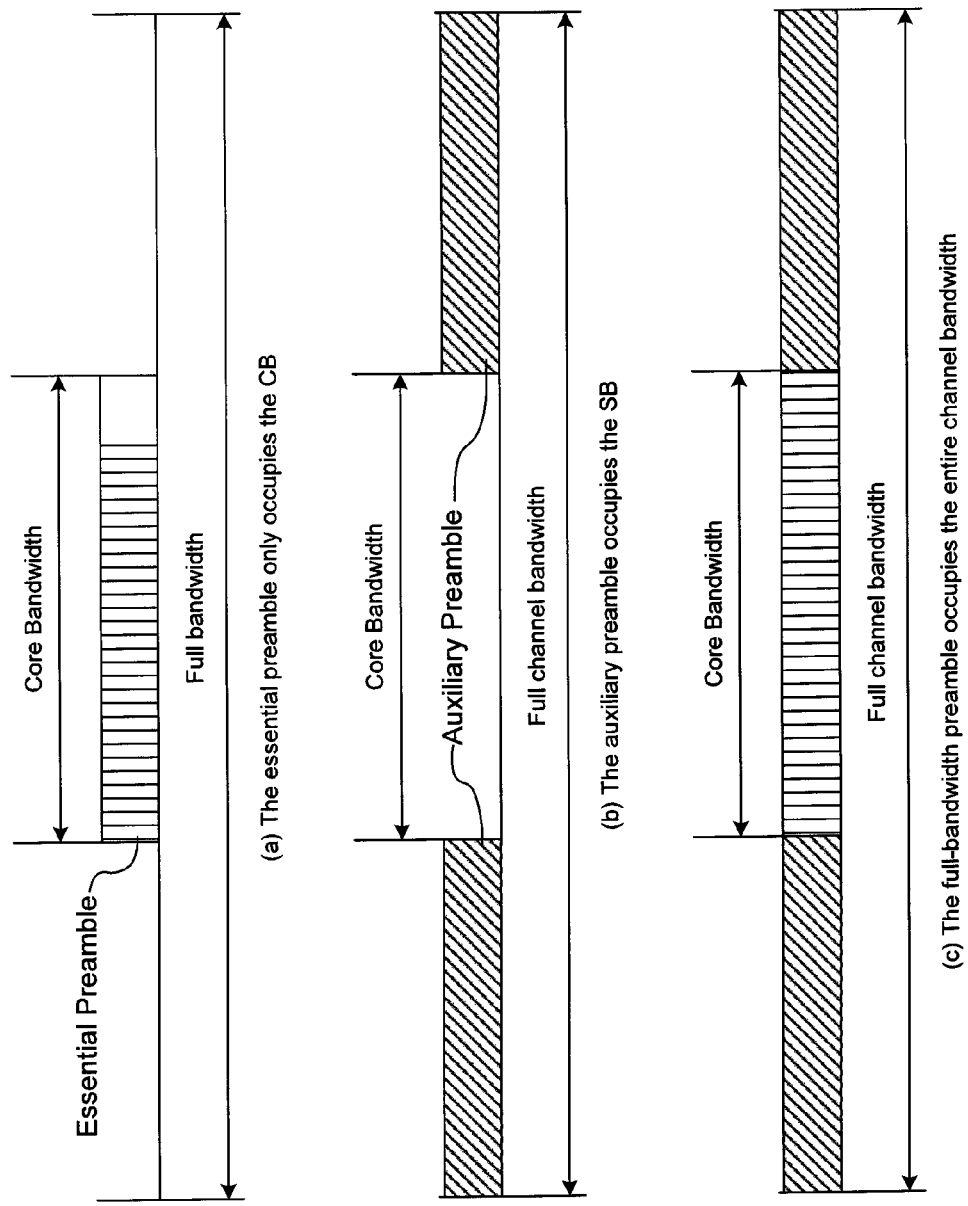
FIG. 8 depicts a preamble designed to occupy either an entire operating bandwidth or a core-band.

In another embodiment, a preamble, called an essential, or primary preamble (EP), is designed to only occupy the CB, as depicted in FIG. 8. The EP alone is sufficient for the basic radio operation. The EP can be either a direct sequence in the time domain with its frequency response confined within the CB, or an OFDM symbol corresponding to a particular pattern in the frequency domain within the CB. In either case, an EP sequence may possess some or all of the following properties:
 1. Its autocorrelation exhibits a relatively large ratio between the correlation peak and sidelobe levels.
 2. Its cross-correlation coefficient with another EP sequence is significantly small with respect to the power of the EP sequences.
 3. Its peak-to-average ratio is relatively small.
 4. The number of EP sequences that exhibit the above three properties is relatively large.

In yet another embodiment, a preamble, called an auxiliary preamble (AP), which occupies the SB, is combined with the EP to form a full-bandwidth preamble (FP) (e.g., appended in the frequency domain or superimposed in the time domain). An FP sequence may possess some or all of the following properties:
 1. Its autocorrelation exhibits a relatively large ratio between the correlation peak and sidelobe levels.
 2. Its cross-correlation coefficient with another FP sequences is significantly small with respect to the power of the FP sequences.
 3. Its peak-to-average ratio is relatively small.
 4. The number of FP sequences that exhibits the above three properties is relatively large.

In still another embodiment, the formation of an FP by adding an AP allows a base station to broadcast the FP, and a mobile station to use its corresponding EP, to access this base station. An FP sequence may also possess some or all of the following properties:
 1. Its correlation with its own EP exhibits a relatively large ratio between the correlation peak and sidelobe levels.
 2. Its cross-correlation coefficient with any EP sequence other than its own is significantly small with respect to its power.
 3. The number of FP sequences that exhibit the above two properties is relatively large.

Automatic Bandwidth Recognition

The VB-OFDMA receiver is capable of automatically recognizing the operating bandwidth when it enters in an operating environment or service area of a particular frequency and channel bandwidth. The bandwidth information can be disseminated in a variety of forms to enable Automatic Bandwidth Recognition (ABR).

In one embodiment, a mobile station, when entering in an environment or an area that supports the VB operation or services, will scan the spectral bands of different center frequencies. If it detects the presence of a signal in a spectral band of a particular center frequency by using envelope detection, received signal strength indicator (RSSI), or by other detection methods, it can determine the operating channel bandwidth by bandwidth-center frequency association such as table lookup. For example, a table such as Table 2 is stored in the receiver. Based on the center frequency that it has detected, the mobile station looks up the value of the channel bandwidth from the table.

TABLE 2

Sample Center Frequency and Corresponding Bandwidth

| Center frequency | Channel Bandwidth |
|---|---|
| 2.31 GHz | 10 MHz |
| 2.56 GHz | 6 MHz |
| 2.9 G | 8 MHz |

In another embodiment, the system provides the bandwidth information via downlink signaling, such as using a broadcasting channel or a preamble. When entering into a VB network, the mobile stations will scan the spectral bands of different center frequencies in which the receiver is designed to operate and decode the bandwidth information contained in the broadcasting channel or preamble.

Multi-Mode (Multi-Range) VB-OFDMA

In accordance with the principles of this invention, multi-modes are devised for a VB-OFDMA system to handle an exceptionally wide range of variation in channel bandwidth. The entire range of bandwidth variation is divided into smaller parts—not necessarily in equal size—each of which will be dealt with as a separate mode or range.

Figure 9:
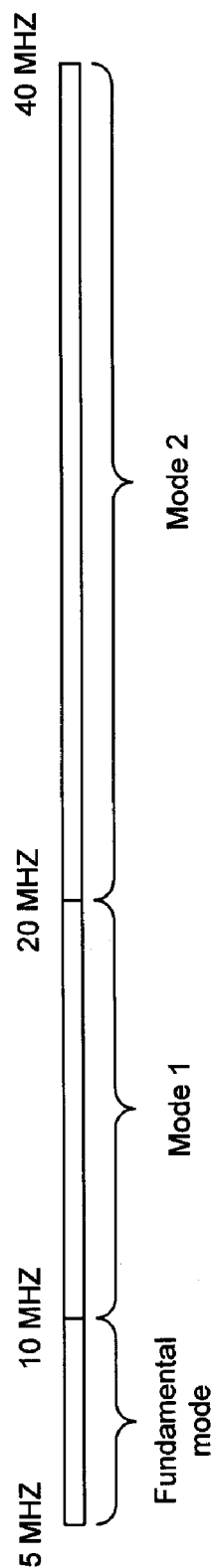
FIG. 9 shows an entire range (e.g., from 5 Mhz to 40 MHz) of bandwidth variation being divided into smaller groups or trunks (e.g., 5-10 MHz, 10-20 MHz, 20-40 MHz, in sizes), wherein each trunk is handled in one particular range.

FIG. 9 illustrates the entire range (e.g., from 5 MHz to 40 MHz) of bandwidth variation being divided into smaller parts (e.g., 5-10 MHz, 10-20 MHz, 20-40 MHz, in sizes). Each part is handled in one particular mode. The mode for the lowest range of bandwidth is labeled as "fundamental mode" and other modes are called "higher modes" (Mode 1, Mode 2, etc.).

The sampling frequency of a higher mode is higher than the sampling frequency of the fundamental mode. In one embodiment the sampling frequency of a higher mode is a multiple of the sampling frequency of the fundamental mode. In this embodiment, in the higher modes, the FFT size can be multiplied in accordance with the sampling frequency, thereby maintaining the time duration of the OFDM symbol structure. For example, the parameters for the case of a multi-mode design are given in Table 3. Alternatively, a higher mode can be realized by maintaining the FFT size and shortening the OFDM symbol duration accordingly. For example, for Mode 1 in Table 3, the FFT size can be maintained at 1024, whereas the sampling frequency is doubled and the symbol length is a half of that for the fundamental range. Yet another higher-mode realization is to both increase the FFT size and shorten the symbol duration accordingly. For example, for Mode 2 (20 MHz to 40 MHz in bandwidth), both the FFT size and the sampling frequency can be doubled as those of the fundamental range, whereas the symbol length is halved as that of the fundamental range. The width of the CB in a multi-mode VB-OFDMA system may not be greater than the smallest bandwidth in the fundamental mode.

TABLE 3

Sample System Parameters

|  | Mode 1 | | | | | Fundamental-Mode | | |
|---|---|---|---|---|---|---|---|---|
| Sampling freq. | 23.04 MHz | | | | | 11.52 MHz | | |
| FFT size | 2048 points | | | | | 1024 points | | |
| Subcarrier spacing | 11.25 kHz | | | | | | | |
| Channel bandwidth (MHz) | 20 | 18 | 15 | 12 | 10 | 8 | 6 | 5 |
| # of usable subcarriers | 1600 | 1440 | 1200 | 960 | 800 | 680 | 480 | 400 |

Figure 10:
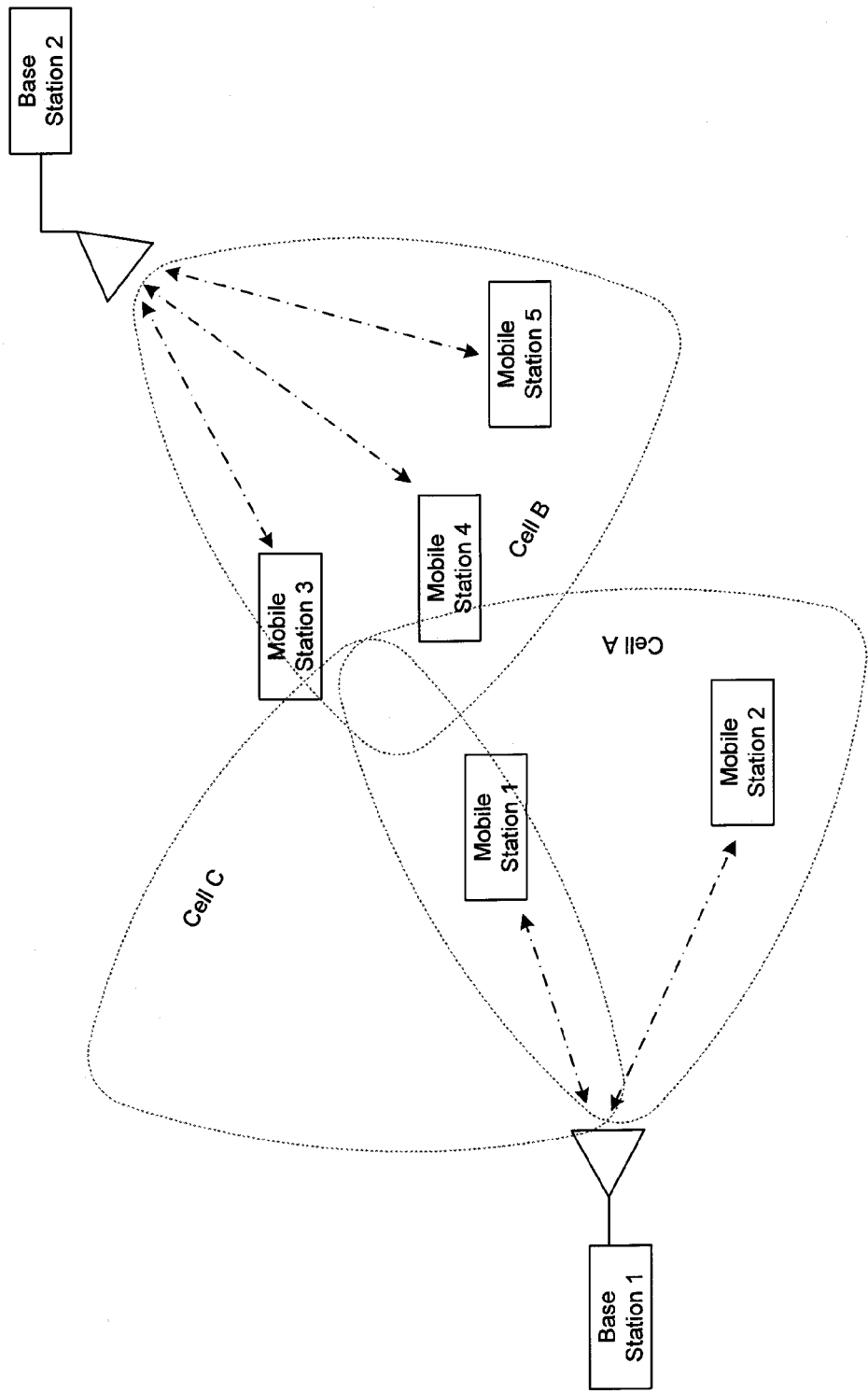
FIG. 10 illustrates a multi-cell, multi-user cellular system comprising multiple base stations and mobile stations.

FIG. 10 illustrates a multi-cell, multi-user cellular system comprising multiple base stations and mobile stations. The system of FIG. 10 is an example of an environment in which the attributes of the invention can be utilized.

While specific circuitry may be employed to implement the above embodiments, aspects of the invention can be implemented in a suitable computing environment. Although not required, aspects of the invention may be implemented as computer-executable instructions, such as routines executed by a general-purpose computer, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the term "computer" refers to any of the above devices and systems, as well as any data processor.

Aspects of the invention can be embodied in a special purpose computer or data processor that is specifically programmed, configured, or constructed to perform one or more of the processes explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

The above detailed description of the embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes are presented in a given order, alternative embodiments may perform routines having steps in a different order, and some processes may be deleted, moved, added, subdivided, combined, and/or modified. Each of these processes may be implemented in a variety of different ways.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, and the PCT Application entitled "Methods and Apparatus for Communication with Time-Division Duplexing," filed Apr. 29, 2005, assigned to Waltical Solutions, (Ser. No. 11/568,385) are incorporated herein by reference.

Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. In a variable bandwidth wireless communication system communicating under multiple different communication schemes that each have a different bandwidth, a process performed by a base station of generating an information bearing signal for wireless transmission, the process comprising:
   utilizing by the base station a number of subcarriers to construct a variable bandwidth wireless channel;
   utilizing by the base station groups of subcarriers, wherein each group includes a plurality of subcarriers;
   maintaining a fixed spacing between adjacent subcarriers;
   adding or subtracting, by the base station, groups of subcarriers to scale the variable bandwidth wireless channel and achieve an operating channel bandwidth; and
   wherein a core-band, including a plurality of subcarrier groups, substantially centered at an operating center frequency of the different communication schemes, is utilized by the base station as a broadcast channel carrying radio control and operation signalling, where the core-band is substantially not wider than a smallest possible operating channel bandwidth of the system; and
   wherein the information bearing signal has a primary preamble sufficient for basic radio operation and wherein:
      the primary preamble is a direct sequence in the time domain with a frequency content confined within the core-band, or is an orthogonal frequency-divisional multiplexing (OFDM) symbol corresponding to a particular frequency pattern within the core-band; and
      wherein properties of the primary preamble comprise:
         an autocorrelation having a large correlation peak with respect to sidelobes;
         a cross-correlation with other primary preambles having a small cross-correlation coefficient with respect to power of other primary preambles; and
         a small peak-to-average ratio; and
         wherein a large number of primary preamble sequences exhibit the properties.

2. The process of claim 1, wherein the information bearing signal is:
   an orthogonal frequency division multiple access (OFDMA) signal; and is
   utilized in a downlink with a duplexing technique that is either Time Division Duplexing (TDD) or Frequency Division Duplexing (FDD).

3. The process of claim 1, wherein an auxiliary preamble, occupying the side-band, is combined with the primary preamble to form a full-bandwidth preamble in either the time domain or the frequency domain, wherein the side-band is the difference between the core-band and an operating bandwidth, and wherein:
   the auxiliary preamble is either a direct sequence in the time domain with a frequency response confined within the side-band, or is an OFDM symbol corresponding to a particular frequency pattern within the side-band;
   the full-bandwidth preamble allows a base station to broadcast the full-bandwidth preamble and a mobile station to use the primary preamble of the full-bandwidth preamble to access the base station; and
   properties of the full-bandwidth preamble sequence comprise:
      a large correlation peak with respect to sidelobes, in case of an autocorrelation;
      a large ratio between the correlation peak and sidelobes, in case of a correlation with the primary preamble of the full-bandwidth preamble;
      a small cross-correlation coefficient with respect to power of other full-bandwidth preamble sequences, in case of cross-correlation with other full-bandwidth preambles
      a small cross-correlation coefficient with respect to the power of the full-bandwidth preamble, in case of cross-correlation with a primary preamble different from the primary preamble of the full-bandwidth preamble;
      a small peak-to-average ratio; and
      wherein a large number of full-bandwidth preamble sequences exhibit such properties.

4. In a variable bandwidth communication network of base stations and mobile stations, wherein a signal comprises groups of subcarriers and each group includes a plurality of subcarriers, a method performed by a mobile station comprising:
   maintaining a fixed spacing between adjacent subcarriers;
   adjusting a number of groups of subcarriers to scale a channel and attain an operational bandwidth;
   utilizing a core-band, substantially centered at an operating center frequency to carry synchronization information, wherein the core-band is narrower than or equal to a smallest possible operating channel bandwidth of the network and the signal includes a primary preamble sufficient to enable radio operations, the primary preamble including a direct sequence in the time domain with a frequency content confined within the core-band or including an OFDM symbol corresponding to a particular frequency pattern within the core-band;
   wherein properties of the primary preamble comprise:
      an autocorrelation having a large correlation peak with respect to sidelobes;
      a cross-correlation with other primary preambles having a small cross-correlation coefficient with respect to power of other primary preambles; and
      a small peak-to-average ratio; and wherein a large number of primary preamble sequences exhibit the properties; and scanning spectral bands of different center frequencies and detecting the synchronization information in the core-band of the operating center frequency and decoding a broadcast channel carrying radio control and operation signalling provided by a base station to the mobile station via the core-band.

5. The method of claim 4, wherein the signal is an orthogonal frequency division multiple access (OFDMA) signal, and the signal is utilized in a downlink with a duplexing technique that is either Time Division Duplexing (TDD) or Frequency Division Duplexing (FDD).

6. In a variable bandwidth communication network wherein a communication signal utilizes groups of subcarriers, wherein each group comprises a plurality of subcarriers, and a mobile station has an adaptable bandwidth, the mobile station comprising:

an analog-to-digital converter for signal sampling;
a Fast Fourier Transform and Inverse Fast Fourier Transform processor (FFT/IFFT), wherein a fixed spacing between adjacent subcarriers is maintained;
a scanner for scanning spectral bands of specified center frequencies;
a facility for decoding a broadcast channel including radio control and operation signalling associated with a core-band including a plurality of groups, wherein the core-band is not wider than a smallest possible operating channel bandwidth of the network; and
a facility for adding groups to widen the channel bandwidth for remainder of the communication, wherein the communication signal further utilizes the core-band for communicating a primary preamble sufficient to enable radio operations, the primary preamble being a direct sequence in the time domain with a frequency content confined within the core-band or being an OFDM symbol corresponding to a particular frequency pattern within the core-band,
wherein properties of the primary preamble comprise:
an autocorrelation having a large correlation peak with respect to sidelobes;
a cross-correlation with other primary preambles having a small cross-correlation coefficient with respect to power of other primary preambles; and
a small peak-to-average ratio; and
wherein a large number of primary preamble sequences exhibit the properties.

7. The mobile station of claim 6, wherein the communication signal is an orthogonal frequency division multiple access (OFDMA) signal, and the communication signal is utilized in a downlink with a duplexing technique that is either Time Division Duplexing (TDD) or Frequency Division Duplexing (FDD).

8. A cellular base station comprising:
circuitry configured to transmit a broadcast channel in an orthogonal frequency division multiple access (OFDMA) core-band, wherein the core-band is substantially centered at an operating center frequency and the core-band includes a first plurality of subcarrier groups, wherein each subcarrier group includes a plurality of subcarriers, wherein the core-band is utilized to communicate a primary preamble sufficient to enable radio operations, the primary preamble being a direct sequence in the time domain with a frequency content confined within the core-band or being an OFDM symbol corresponding to a particular frequency pattern within the core-band,
wherein properties of the primary preamble comprise:
an autocorrelation having a large correlation creak with respect to sidelobes;
a cross-correlation with other primary preambles having a small cross-correlation coefficient with respect to power of other primary preambles; and
a small peak-to-average ratio; and
wherein a large number of primary preamble sequences exhibit the properties; and
circuitry configured to transmit control and data channels using a variable band including a second plurality of subcarrier groups, wherein the variable band includes at least the core-band.

9. The cellular base station of claim 8 wherein the circuitry configured to transmit the broadcast channel is further configured to transmit radio network information in the broadcast channel.

10. The cellular base station of claim 8 further comprising circuitry configured to transmit synchronization information in the core-band.

11. The cellular base station of claim 8 wherein the circuitry configured to transmit the broadcast channel is further configured to transmit in a time slot format.

12. The cellular base station of claim 8 wherein the base station operates in an OFDMA frequency division duplex (FDD) or time division duplex (TDD) mode.

13. A cellular mobile station comprising:
circuitry configured to receive synchronization information from a base station in an orthogonal frequency division multiple access (OFDMA) core-band, wherein the core-band is substantially centered at an operating center frequency and the core-band includes a first plurality of subcarrier groups where each subcarrier group includes a plurality of subcarriers, wherein the core-band is utilized to communicate a primary preamble sufficient to enable radio operations, the primary preamble being a direct sequence in the time domain with a frequency content confined within the core-band or being an OFDM symbol corresponding to a particular frequency pattern within the core-band,
wherein properties of the primary preamble comprise:
an autocorrelation having a large correlation peak with respect to sidelobes;
a cross-correlation with other primary preambles having a small cross-correlation coefficient with respect to power of other primary preambles; and
a small peak-to-average ratio; and
wherein a large number of primary preamble sequences exhibit the properties;
circuitry configured to synchronize with the base station using the received synchronization information; and
circuitry configured to receive control and data channels using a variable band including a second plurality of subcarrier groups, wherein the variable band includes at least the core-band.

14. The cellular mobile station of claim 13 wherein the circuitry configured to receive the synchronization information from the base station in the core-band is further configured to receive cell identification information from the base station in the core-band.

15. The cellular mobile station of claim 13 further comprising circuitry configured to receive a broadcast channel in the core-band.

16. The cellular mobile station of claim 15 wherein the broadcast channel carries radio network information.

17. The cellular mobile station of claim 13 further comprising circuitry configured to transmit a preamble after synchronizing with the base station.

18. A variable bandwidth communication method comprising:

transmitting a broadcast channel by a cellular base station in an orthogonal frequency division multiple access (OFDMA) core-band, wherein the core-band is substantially centered at an operating center frequency and the core-band includes a first plurality of subcarrier groups, wherein each subcarrier group includes a plurality of subcarriers, wherein the core-band is utilized to communicate a primary preamble sufficient to enable radio operations, the primary preamble being a direct sequence in the time domain with a frequency content confined within the core-band or being an OFDM symbol corresponding to a particular frequency pattern within the core-band wherein properties of the primary preamble comprise:

an autocorrelation having a large correlation peak with respect to sidelobes;

a cross-correlation with other primary preambles having a small cross-correlation coefficient with respect to power of other primary preambles; and a small peak-to-average ratio; and wherein a large number of primary preamble sequences exhibit the properties; and transmitting control and data channels by the cellular base station using a variable band including a second plurality of subcarrier groups, wherein the variable band includes at least the core-band.

19. The method of claim 18 wherein the broadcast channel carries radio network information.

20. The method of claim 18 further comprising transmitting by the base station synchronization information in the core-band.

21. The method of claim 18 wherein the transmissions are in a time slot format.

22. The method of claim 18 wherein the cellular base station operates in an OFDMA frequency division duplex (FDD) or time division duplex (TDD) mode.

23. A variable bandwidth communication method comprising:

receiving synchronization information by a cellular mobile station from a base station in an orthogonal frequency division multiple access (OFDMA) core-band, wherein the core-band is substantially centered at an operating center frequency and the core-band includes a first plurality of subcarrier groups where each subcarrier group includes a plurality of subcarriers, wherein the core-band is utilized to communicate a primary preamble sufficient to enable radio operations, the primary preamble being a direct sequence in the time domain with a frequency content confined within the core-band or being an OFDM symbol corresponding to a particular frequency pattern within the core-band wherein properties of the primary preamble comprise:

an autocorrelation having a large correlation peak with respect to sidelobes;

a cross-correlation with other primary preambles having a small cross-correlation coefficient with respect to power of other primary preambles; and a small peak-to-average ratio; and wherein a large number of primary preamble sequences exhibit the properties;

synchronizing the cellular mobile station with the base station using the received synchronization information; and receiving control and data channels by the cellular mobile station using a variable band including a second plurality of subcarrier groups, wherein the variable band includes at least the core-band.

24. The method of claim 23 wherein the receiving of the synchronization information by the cellular mobile station from the base station in the core-band includes receiving cell identification information from the base station in the core-band.

25. The method of claim 23 further comprising receiving by the cellular mobile station a broadcast channel in the core-band.

26. The method of claim 25 wherein the broadcast channel carries radio network information.

27. The method of claim 23 further comprising transmitting by the cellular mobile station a preamble after synchronizing with the base station.

* * * * *

UNITED STATES PATENT AND TRADEMARK OFFICE
CERTIFICATE OF CORRECTION

| | | |
|---|---|---|
| PATENT NO. | : 7,787,431 B2 | Page 1 of 1 |
| APPLICATION NO. | : 10/583534 | |
| DATED | : August 31, 2010 | |
| INVENTOR(S) | : Xiaodong Li | |

It is certified that error appears in the above-identified patent and that said Letters Patent is hereby corrected as shown below:

Column 12, line 2, "large correlation creak with" should read --large correlation peak with--.

Signed and Sealed this
Eighteenth Day of January, 2011

David J. Kappos
*Director of the United States Patent and Trademark Office*